United States Patent
Stephenson et al.

(10) Patent No.: US 6,216,532 B1
(45) Date of Patent: Apr. 17, 2001

(54) GAS FLOW RATE MEASUREMENT

(75) Inventors: Kenneth E. Stephenson, Cambridge (GB); Bernard Theron, Igny (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/308,915

(22) PCT Filed: Nov. 27, 1997

(86) PCT No.: PCT/GB97/03268

§ 371 Date: Jul. 8, 1999

§ 102(e) Date: Jul. 8, 1999

(87) PCT Pub. No.: WO98/23931

PCT Pub. Date: Jun. 4, 1998

(30) Foreign Application Priority Data

Nov. 29, 1996 (GB) .................................................. 9624899

(51) Int. Cl.[7] .............................. E21B 47/00; G01F 1/56

(52) U.S. Cl. ...................................... 73/152.21; 73/861.08

(58) Field of Search ........................... 73/152.18, 152.21, 73/152.29, 152.31, 152.46, 861.32, 861.25, 861.08, 861.06, 861.16

(56) References Cited

U.S. PATENT DOCUMENTS

| | | | | |
|---|---|---|---|---|
| 4,102,185 | * | 7/1978 | Dowling et al. | 73/155 |
| 4,441,361 | * | 4/1984 | Carlson et al. | 73/155 |

(List continued on next page.)

FOREIGN PATENT DOCUMENTS

| | | | |
|---|---|---|---|
| 28 17 018 A1 | 10/1979 | (DE) | G01N/9/24 |
| 0 362 011 A1 | 4/1990 | (EP) | E21B/47/10 |

(List continued on next page.)

OTHER PUBLICATIONS

Schnorr, D.R. "Logs Determine Water Flow Behind Pipe in Alaska". *Oil and Gas Journal,* vol. 91, No. 45, (Nov. 8, 1993) Tulsa, OK, pp. 77–81.

"Pulsed–Neutron Three–Phase–Holdup Measurements in Horizontal Wells", *Journal of Petroleum Technology* (Nov. 1997) pp. 1256–1257.

*Primary Examiner*—Helen Kwok
(74) *Attorney, Agent, or Firm*—William L. Wang; William B. Batzer

(57) ABSTRACT

Once an oil well has been drilled and is producing, it is desirable to monitor the rate at which oil or gas is being delivered. It is particularly useful to know when there is a change in a fluid's output rate, for that can indicate problems with the well. This monitoring is known as "production logging". Prior to the introduction of horizontal well drilling, most wells were either vertical or only slightly deviated. However, many present-day wells have long horizontal or nearly-horizontal portions, and the techniques used to measure flow in vertical wells are not applicable to horizontal wells. Moreover, any flow rate measurement technique to be used downhole should take account not only of the several sorts of "lined" wells but also the "barefoot" ones.

The invention seeks to satisfy this need for a technique that can be employed with all these sorts of completed well by utilizing a pair of correlated spaced sensors (that can detect "directly" the difference between gas and liquid (oil and/or water), which sensor pair is carried on a logging tool positioned within the borehole itself such that the individual sensors are disposed so as to be actually in the path of any gas bubbles likely to be in the fluid. The correlated output of the sensor pair allows a determination of the gas flow velocity, and if at the same time measurements are taken that provides an indication of the hold-up of the gas bubbles there may by calculation be determined the flow rate both of the gas and of the fluid.

8 Claims, 1 Drawing Sheet

U.S. PATENT DOCUMENTS

| | | | |
|---|---|---|---|
| 4,683,759 | 8/1987 | Skarsvaag et al. | 73/861.04 |
| 4,978,863 | 12/1990 | Lyons et al. | 250/574 |
| 5,367,911 * | 11/1994 | Jewell et al. | 73/861.08 |
| 5,532,482 * | 7/1996 | Stephenson | 250/269.4 |
| 5,561,245 | 10/1996 | Georgi et al. | 73/152.02 |

FOREIGN PATENT DOCUMENTS

| | | | |
|---|---|---|---|
| 0 372 598 A2 | 6/1990 | (EP) | E21B/47/00 |
| 0 510 774 A2 | 10/1992 | (EP) | G01F/1/74 |
| 2 210 461 | 6/1989 | (GB) | G01N/33/26 |
| 2 280 267 | 1/1995 | (GB) | G01F/1/712 |
| WO 98/24811 | 12/1993 | (WO) . | |

\* cited by examiner

GAS FLOW RATE MEASUREMENT

FIELD OF THE INVENTION

This invention relates to gas flow rate measurement, and concerns in particular the measurement of the flow of gas in a multiphase gas and liquid environment in a nearly-horizontal ascending borehole.

BACKGROUND OF THE INVENTION

Once a well—especially an oil- or gas-well—has been drilled and is producing the sought-after fluid(s), it is desirable to monitor the rate at which each fluid (such as oil or gas, or, in a multiphase well, mixtures of these with each other and/or with water) is being delivered. It is particularly useful to know when there is a change in a fluid's output rate, for that can indicate problems with the well—for instance, that the well is coming to the end of its useful life, or that material is leaking in (or out) of the well before it gets to the surface. This monitoring is known as "production logging"—definable as the measurement of fluid flow rates as a function of depth in an oil or gas well—and has been in use for many years.

The primary motivation of production logging is to monitor production flow rates of the various fluids (oil, water and gas), and to locate depths in the well of entry of unwanted fluids. Once the entry depths are located, various steps are available to shut off the unwanted entry.

Prior to the introduction of horizontal well drilling, most wells were either vertical or only slightly deviated (from 0 to at most 60 degrees from the vertical), and so there was little need to measure flow rates in nearly-horizontal wells. However, many present-day wells have long horizontal or nearly-horizontal portions (at 80 or 90 degrees to the vertical), and, because the conditions in horizontal wells are very different from those in vertical or only-slightly-deviated wells, the techniques used to measure flow in these latter types of well are simply not applicable to horizontal wells. One example of such an inapplicable technique involves the use of a gradiomanometer; this is a device which determines the density of a fluid by measuring the pressure gradient caused by gravity in a column of fluid—but since in horizontal wells gravity acts at right angles to the line of the wellbore, this technique simply does not work in them. Another inapplicable technique involves the use of a so-called "spinner"—a small propeller/turbine driven by the passing fluid. The spinner conventionally used in production logging to measure flow rate does not give an interpretable response in horizontal wells, where it responds primarily to the liquid, and hardly at all to the gas.

The invention solves this problem by utilising—by taking advantage of—some of those very features which are peculiar to horizontal wells, such as "slug flow".

Of course, it is not unknown in many fields—and even in the oil industry—to take measurements of multiphase flow in nearly-horizontal pipelines. However, to date most of these pipelines have been surface pipelines, such as might convey the fluid from a well head to a storage system, or from one part of a refinery to another, and these are very different from the nearly-horizontal underground boreholes involved in actually producing the fluids in the first place. Down a well the pressures are enormous—several hundreds of atmospheres—and any gas bubbles are necessarily compressed into a relatively small size. On the surface, however, there is relatively-speaking no compressive pressure, so that those gas bubbles expand to a relatively large size—and because of these large amounts of free gas the flow is often "slug flow", with liquid-rich regions of flow alternating with gas-rich regions. This time-varying nature of the flow has been suggested for use to measure the velocity of the various flow components; for example, one proposal involves beaming gamma rays into and through the pipes from external sources, and using correlated external detectors to measure slug velocity and, by the gamma ray attenuation, the volume fraction of the flow.

As in surface pipelines, so in nearly-horizontal but ascending wells free gas flows along and up the well typically as bubbles along the upper side of the borehole (in descending wells, the gas forms a stratified layer rather than bubbles). Unfortunately, for several reasons it is difficult to use the "surface" type of measurement system actually in a borehole; taking measurements downhole is different from taking them at or near the surface in a number of significant ways. In the first place—and as mentioned above—because of the higher pressures in a borehole much of the gas downhole is dissolved in the liquid, and the size of the gas bubbles is much smaller, typically not nearly filling the pipe. Such small amounts of gas are difficult to detect with gamma attenuation devices. Also, systems which require that sources and/or detectors be placed outside the flow obviously cannot be used for borehole flow measurements, which must have all sources and/or detectors within the borehole (or within any liner, if there is one [this is discussed further below]). Additionally, there may be problems downhole that stem from the borehole having a liner—typically a "slotted" liner and the normal surface measurement techniques are unable to cope with the downhole problem of fluid flow in the annulus between the liner and the borehole surface proper. Added to this, of course, are the difficulties and dangers associated with the radioactive sources needed for the gamma ray generation; these cannot be turned off, and any apparatus which uses them can be a safety hazard.

Wells can be configured or "completed" in a number of ways. Sometimes a fairly tight-fitting steel liner—a large aperture tube—is placed within the borehole to line its sides, and cement is squeezed between the liner and the borehole wall to complete that lining. Holes are then made in the liner and cement with explosive charges (to let the production fluid out of the underground geological formation through which the borehole is passing at that point), and this combination is called a "cemented completion". On the other hand, sometimes there is employed a "slotted liner"—a steel liner with holes or slots pre-installed. In this case, no cement is used, so the liner tube is fairly loose within the borehole, and no additional holes are necessary. Such a slotted well gives rise to particular difficulties because of the freedom of the well fluid to flow both within the liner and also in the gap—the annulus—between the liner and the borehole walls. Finally, sometimes—usually in an effort to save money—no liner at all is installed in the borehole; this is called a "barefoot completion".

Any flow rate measurement technique to be used downhole should if possible take account not only of the several sorts of "lined" wells but also the "barefoot" ones. Accordingly, a production logging tool will preferably make accurate flow measurements in any of these types of completions. This is particularly difficult in the case of a slotted liner, where as noted there will be fluid flowing both in the liner and in the annulus therearound.

SUMMARY OF THE INVENTION

The invention seeks to satisfy this need for a technique that can be employed with all these sorts of completed well by using a modified version of the techniques employed in above-ground flow rate measurement, and utilising a pair of correlated spaced sensors that can detect "directly" the difference between gas and liquid (oil and/or water), which sensor pair is carried on a logging tool positioned within the borehole itself such that the individual sensors are disposed so as to be actually in the path of any gas bubbles likely to be in the fluid. The correlated output of the sensor pair allows a determination of the gas flow velocity, and if at the same time measurements are taken that provides an indication of the hold-up of the gas bubbles—in other words, the size of the bubbles as an area proportion of the borehole cross-sectional area—there may by calculation be determined the flow rate both of the gas and of the fluid.

In one aspect, therefore, this invention provides a method of determining downhole the flow rate—in nearly-horizontal sections of a well borehole—of gas within a multiphase fluid containing a mixture of gas and liquid, in which method:

there is positioned within the length of borehole of interest a logging tool carrying thereon a pair of sensors spaced apart a known distance axially along the tool (and thus along the borehole), each sensor being able "directly" to detect the difference between gas and liquid, and being so mounted on the tool that, with the tool positioned within the borehole, the sensor is disposed to be actually in the path of any gas bubbles likely to be in the fluid;

the output of the sensor pair is correlated to allow an identification of individual gas bubbles passing from one sensor to the other, and for the time taken by this passage to be measured, and from a distance-over-time calculation there is then determined the gas bubble velocity;

there is determined the time-averaged hold-up of the gas within the multiphase fluid; and by a hold-up-times-borehole area-times-gas bubble velocity calculation there is then determined the gas flow rate within that length of the borehole.

The invention also provides apparatus for use in the defined method of determining downhole the gas flow rates of a multiphase gas/liquid fluid, the apparatus comprising:

a logging tool to be positioned within the length of borehole of interest, the tool carrying thereon a pair of sensors spaced apart a known distance axially along the tool (and thus along the borehole), each sensor being able in use "directly" to detect the difference between gas and liquid, and being so mounted on the tool that, with the tool positioned within the borehole, the sensor is disposed to be actually in the path of any gas bubbles likely to be in the fluid; and correlation and calculation means whereby the output of the sensor pair may be correlated to allow an identification of individual gas bubbles passing from one sensor to the other, and for the time taken by this passage to be measured, and from a distance-over-time calculation there may then be determined the gas bubble velocity, whereby there may be determined the time-averaged hold-up of the gas within the multiphase fluid, and whereby by a hold-up-times-borehole area-times-gas bubble velocity calculation there may then be determined the gas flow rate within that length of the borehole.

The invention is for determining downhole the flow rate—in nearly-horizontal lengths of a well borehole—of the gas in a multiphase fluid containing a mixture of gas and liquid. As indicated above, "nearly horizontal" means from around 80 to 90 degrees to the vertical, though the method may still find a use in well lengths which are less than 80 degrees—say, 75 or even 70 degrees—to the vertical. Of course, the well may have other sections which are vertical or nearly vertical to which the nearly-horizontal length(s) is/or joined; most commonly a well may start vertical or near-vertical, and then curve over to become horizontal or near-horizontal as it enters and passes through the oil-bearing underground formation of interest.

The invention is for use with wells producing multiphase fluids containing a mixture of gas and liquid (which latter may be oil or water alone or, as is more likely, oil and water together). Well fluids can have extensively varying component proportions—in particular, there are very wide ranges of the fraction of water in the liquid—but typically not more than about 25% of the borehole volume is occupied by gas.

In the invention there is positioned within the length of borehole of interest a logging tool carrying thereon a pair of sensors. The sensors may be of any type provided that they can directly determine the difference between gas and liquid, by measuring some property of the two that differs in a suitably significant manner. Such sensors include fibre optic reflectance sensors and resistivity sensors.

The preferred variety of sensor for measuring the property change is a fibre optic reflectance sensor, which measures the refractive index of the fluid in a very small region at the tip of the sensor. This type of sensor can detect changes with time in the refractive index of gas and liquids. Since these sensors are very small, they can be placed very near the top of the borehole or liner, and so are sensitive to very small bubbles of gas.

A second type of sensor is that known as a local resistivity probe. A local resistivity probe consists of two closely spaced electrodes and a means for measurement of the electrical resistivity of whatever material—gas or liquid—is positioned or passes between the two electrodes. When the electrodes are placed in water, a relatively low resistivity is recorded (in oil wells the water is usually brine, loaded with salt and other ionic materials, and is really quite a good conductor of electricity), while, when placed in hydrocarbons, either oil or gas, a relatively high resistivity is recorded. These sensors do not directly detect gas as they cannot distinguish gas from oil, but they can directly detect changes in the water level as a gas bubble passes by, and hence indirectly they detect the gas. As such, these sensors require some water to be present in order to measure gas velocity. Nevertheless, experience has shown that this type of sensor provides a useful measurement of gas velocity if the water-to-liquid ratio is at least 0.15:1.

Other types of sensors are possible. The main requirements are that the sensor be capable of operating inside a borehole environment, and that it measure some property of the fluid which changes with time as the gas bubble passes by.

In the invention there is employed a logging tool carrying thereon a pair of sensors (M1,M2) spaced apart a known distance ($l_d$) axially along the tool (and thus along the borehole; one sensor is the upstream sensor, the other the downstream one). This along-axis separation is used so that there can be detected the time-separated passing of a particular bubble first by one sensor and then by the other, so as to give a means of calculating the speed of the bubble as it moves with the stream of fluid from one to the other. Logging tools are typically about 50 ft (15 m) long, and a satisfactory separation of the two sensors is from less than half an inch (about a centimetre) up to around 10 ft (3 m), preferably around 7½ ft (somewhat over 2 m). Smaller separations make the detection rather inaccurate, while greater separations require the logging tool to be too long.

On the logging tool, each sensor is so mounted on the tool that, with the tool positioned within the borehole, the sensor is disposed to be actually in the path of any gas bubbles likely to be in the fluid. This is an obvious requirement if the sensors are directly to detect some difference between the fluid's phases, and is generally achieved by arranging for the logging tool itself to be fixedly orientated within the borehole, and then for the disposition of the sensors relative to the tool to be predetermined such that in use they will indeed be placed in the bubble path—right at the top side of the horizontal length of borehole as required. It is common for logging tools to need to have such a fixed orientation, and this needs no further comment here, although it may nevertheless be helpful to note that one technique for arranging this is to include a joint in the tool which allows the bottom half of the tool (containing the sensors) to swivel, and an offset weight which then orients by gravity the bottom half of the tool so that the sensors are actually positioned adjacent the upper surface of the horizontal length of borehole.

In the invention the logging tool is carrying thereon a pair of sensors spaced apart a known distance axially along the tool, and the output of the sensor pair is correlated to allow an identification of individual gas bubbles passing with the stream of fluid from one sensor to the other. The idea of correlation to identify occurrences of one sort or another is well-known, and the techniques employed to achieve this do not require any discussion here. Nevertheless, one useful correlation technique appropriate in the present invention is that known as Fourier Transform Cross Correlation, which is described in, for example, the book *Numerical Recipes*, by W H Press (et al).

Once the correlation has allowed the identification of a particular bubble as it passes by first the upstream sensor and then the downstream sensor, then there may be determined, from the sensor measurements, the time (T) taken for this passage. By a distance-over-time calculation there may then be determined the gas bubble velocity ($V_{sg}=l_d/T$).

The invention utilises the gas bubble velocity ($V_{sg}$) to determine the gas flow rate ($q_g$) by a hold-up-times-borehole area-times-gas bubble velocity . . . $q_g=H_g \times A \times V_{sg}$, but of course to do this there must also be known the time-averaged hold-up $H_g$ of the gas. In practice, the time-averaged hold-up is obtained from averaging over many sequential measurements from a "hold-up tool" which measures "snapshots" of the gas hold-up at specific instants in time. Then the gas flow rate—more accurately, the time-averaged gas volume flow rate—is numerically equal to the product of the velocity of the bubbles, which doesn't change significantly with time over the relevant period, and the time-averaged cross sectional area of the pipe occupied by the gas bubbles, which latter is the product of the area of the pipe and the time-averaged hold-up. And hence the equation given above.

The gas hold-up may be determined by any convenient method, such as a pulsed neutron tool (described, for instance, in *Pulsed-Neutron Three-Phase-Holdup Measurements in Horizontal Wells*, JPT Nov 97, p 1256–1257), but for an oil-producing well is preferably effected with an array of optical reflectance probes, which array is of sufficient resolution—has enough individual probes appropriately disposed—to map the position of gas within a cross section of the borehole. For gas and water flows (no oil), an array of local resistivity probes may be used to map gas location, as well. Other methods of mapping the position of gas within the liner, such as x-ray imaging, are also possible. However, x-ray techniques are less desirable as they either use a radioisotope source and are therefore a radiation hazard, or they use an electronic x-ray generator which is expensive and failure prone.

One of the intended purposes of this invention is to measure the velocity of gas bubbles, and thus the gas flow rate, in either a cemented or a barefoot completion in ascending horizontal conditions, and it will be evident that the method as so far described enables such measurements to be accomplished. Another, however, is to provide a better measurement of gas bubble velocity, and thus gas flow rate, in a slotted lined well; to achieve this desideratum the inventive method as so far defined requires an addition to its use to measure what happens within the liner, namely the provision of a method, employable at the same time, which enables a measurement of what is also happening outside the liner—that is, in the annulus between the liner and the borehole wall proper (in such a slotted well most of the bubbles travel in the annulus, while the liquid remains in the liner core because its greater viscosity makes it hard for it to pass through the slots). Such an added method is one in which there is employed a sensor/detector system that can "look" through the liner into the annulus space, and is typified by equipment of the type presently utilised in reservoir saturation measurements, such as the Reservoir Saturation Tool (RST). This sort of equipment incorporates a neutron generator positioned within the liner and radiating neutrons through the liner and the annulus therearound and into the borehole formation, there causing gamma ray emission, the generator being coupled with gamma ray detection apparatus, with two separate detectors spaced along the line of the borehole, so as to measure the gamma rays radiated back through the gas/liquid fluid in both the annulus and the liner core. Such equipment can enable a determination of the total gas flow rate along the borehole, being a combination of that in the liner core and that in the annulus, and if this is coupled with independently-obtained information about the liner core gas flow rate itself then by a calculation—of the former annulus/core rate combination minus the latter core rate alone—then clearly there is provided figures for the annulus gas flow rate on its own.

In another aspect, therefore, the invention provides a method of determining downhole the gas flow rate in a borehole that utilises a slotted liner, in which method:

there is determined, by a method of the invention as already described, the liner gas flow rate within the liner core; and there is additionally employed on the logging tool a neutron generator capable of radiating generated neutrons though the liner and into the borehole formation, together with a pair of gamma ray detectors spaced apart a known distance axially along the tool (and thus along the borehole), each gamma ray detector being able to detect formation-originating gamma rays created by the generated neutrons and so signal the difference between gas and liquid;

the output of the gamma ray detector pair is correlated to allow an identification of individual gas bubbles passing from one detector to the other, and for the time taken by this passage to be measured, and from a distance-over-time calculation there is then determined the gas bubble velocity;

there is determined the time-averaged hold-up of the gas within the multiphase fluid; and by a hold-up-times-borehole area-times-gas bubble velocity calculation there is then determined the total gas flow rate, within both the liner core and also the annulus, for that length of the borehole;

whereafter, by a total gas flow rate-minus-liner gas flow rate calculation there is determined the annulus gas flow rate.

The invention also provides apparatus for determining downhole the gas flow rate in a borehole that utilises a slotted liner, which apparatus is as previously defined and additionally includes:

on the logging tool a neutron generator capable of radiating generated neutrons though the liner and into the borehole formation, together with a pair of gamma ray detectors spaced apart a known distance axially along the tool (and thus along the borehole), each gamma ray detector being able to detect formation-originating gamma rays created by the generated neutrons and so signal the difference between gas and liquid;

together with correlation and calculation means as aforesaid but applicable to the output from the gamma ray detector pair, and whereby, by a total gas flow rate-minus-liner gas flow rate calculation, there may be determined the annulus gas flow rate.

The just-defined preferred form of the invention is, as noted, the previously-defined method (or apparatus) with the addition of the employment on the logging tool of a neutron generator (capable of radiating generated neutrons though the liner and into the borehole formation) together with a pair of spaced gamma ray detectors each able to detect formation-originating gamma rays. These additional detector components are used just like the sensors in the basic method—their output is correlated to allow an identification of individual gas bubbles, the passage time taken by a particular bubble is measured, there is determined the gas bubble velocity, and from a knowledge of the time-averaged hold-up of the gas there is calculated the total gas flow rate, from which may be subtracted the liner gas flow rate to give the annulus gas flow rate. None of this needs any further discussion at this time. However, it will be useful to say a little about the combination of neutron generator and gamma ray detectors.

A preferred type of generator is an electronic generator of 14 MeV neutrons of the type employing a deuteron-triton fusion reaction and commonly used in the oil industry. The neutron generator is coupled with a pair of gamma ray detectors, preferably high-speed scintillation detectors using, for example, GSO or NaI(T1) scintillators. The pair of gamma ray detectors is conveniently spaced a short distance from the neutron generator along the direction of flow, typically about 0.5 to 2 ft (0.15 to 0.6 m), consistent with the physical size of the generator and the detectors. In operation, neutrons from the neutron generator inelastically scatter from nuclei in the surrounding formation, generating a source of gamma rays external to the borehole. Some of the gamma rays then pass back into the borehole, where they are attenuated by the fluid therein—but significantly more by the liquid than by the gas. Each gamma ray detector then detects, and counts, the received gamma rays, and in this case it is the count rate in the detector which is the property which changes with time as the gas bubble passes by. Two gamma ray detectors at different spacings from the neutron generator are used to make the velocity measurement, their count rates being correlated to allow identification of each particular bubble, but only one neutron generator is used. Note that the electronic generator does not suffer from the radiation safety problem because it emits no radiation when it is turned off.

BRIEF DESCRIPTION OF THE DRAWINGS

An embodiment of the invention is now described, though by way of illustration only, with reference to the accompanying diagrammatic Drawings in which.

DETAILED DESCRIPTION OF THE INVENTION

Figure 1:
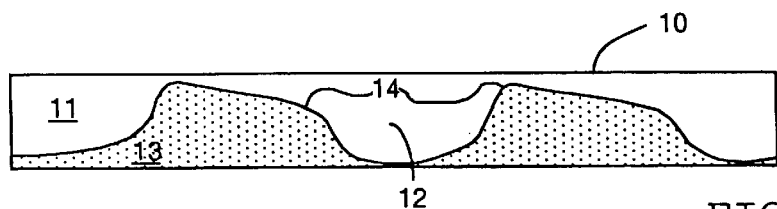
FIG. 1 shows gas/liquid slug flow along an above-ground horizontal pipeline.

Illustrated in FIG. 1 is an example of gas/liquid slug flow along an above-ground horizontal pipeline (10). The gas (11) is in the form of large "bubbles" (12) occupying a relatively large proportion of the pipe's volume, and the liquid (13) is bunched up into "slugs" (14).

Figure 2:
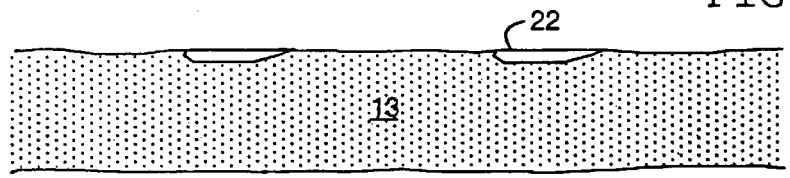
FIG. 2 shows gas/liquid bubble flow along an underground horizontal length of unlined (barefoot) borehole.

FIG. 2 shows much the same sort of situation, but this time the gas/liquid bubble flow is in an underground horizontal length of unlined (barefoot) borehole (20). Here, because of the very much higher pressure, the gas bubbles (22) are much smaller, and disposed right at the top surface of the bore 20, and the oil 13 effectively completely fills the bore.

Figure 3:
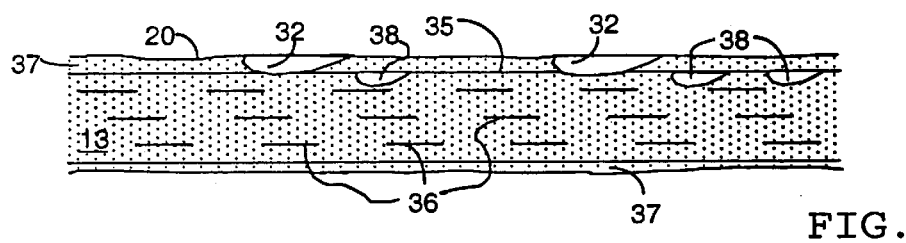
FIG. 3 shows gas/liquid bubble flow along an underground horizontal length of slotted lined borehole.

FIG. 3 shows much the same sort of situation as shown in FIG. 2, but here the gas/liquid bubble flow is in an underground horizontal length of slotted lined borehole 20. As can be seen, the borehole has loosely located within it a metal liner—a tube (35)—that has been formed with a myriad of longitudinal slots (as 36). The liner 35 is a loose fit within the borehole 20, so that an annular space (37) is left around it. This annular space fills with liquid 13 and also with some gas bubbles (as 32) disposed along the top surface. The core volume of the liner also contains a few bubbles (as 38) disposed along its top inner surface.

Figure 4:
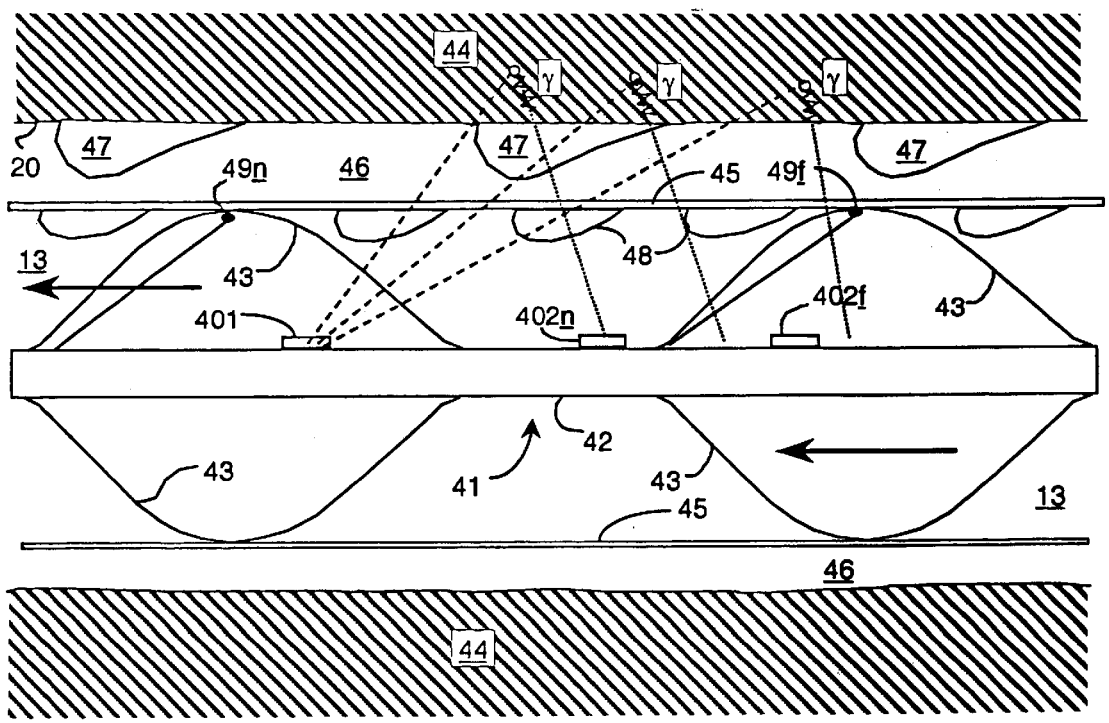
FIG. 4 shows the apparatus used for the measurement of gas/liquid bubble flow along an underground horizontal length of borehole in accordance with a preferred embodiment of the present invention.

FIG. 4 shows the apparatus used in accordance a preferred embodiment of with the present invention for the measurement of gas/liquid bubble flow along an underground horizontal length of slotted lined borehole (like that in FIG. 3).

The apparatus comprises a logging tool (generally 41) having an elongate body (42) with two spaced spring-loaded spacer arm pairs (as 43) that keep it centrally located and suitably orientated (by means not shown) axially of a borehole 20 passing through an underground formation (as 44). The borehole shown is a slotted lined borehole, with a slotted liner (45: the slots are not shown) making a loose fit inside the borehole 20 (and thus having therearound an annulus 46). Flowing along the borehole (from right to left, as viewed) is a multiphase production fluid that is mostly liquid—oil and water—but with some bubbles of gas therein. As shown in FIG. 3, some of the bubbles (as 47) are in the annulus 46, while others (as 48) are actually in the liner core.

The logging tool 41 carries two different sets of bubble "detection" gear. First, here shown on each of the upper of the tool spacer arms 43, is a local probe (49n or 49f) that directly senses and signals the difference between the gas and the liquid, but only in respect of the gas bubbles 48 within the liner core volume. In operation the outputs from these sensors 49 is supplied (by means not shown) to correlation and calculation means (not shown) which use them to work out the speed of the bubbles 48 along the borehole. Thus, for any particular gas bubble the output of the far sensor 49f should match the slightly later output of the near sensor 49n—which identifies the bubble—and, knowing the distance between the two sensors and the time between the two matching outputs there can be calculated the speed of the bubble.

Second, disposed long the body 42 of the tool there is a neutron-generator (401) and a pair of associated gamma ray detectors (402n, 402f); the pair 402 is spaced upstream of the generator 401, and the two individual detectors 402 are spaced one from the other. In operation the neutron-generator 401 generates neutrons which radiate away (for example, along the heavy dashed lines) through the liquid 13, through the gas 48,47, through the liner 45 and into and through the formation 44. In the latter some of the neutrons strike atoms therewithin, and cause the emission of gamma rays (gamma) that radiate—"shine"—back into borehole. As these gamma rays travel back into the borehole they pass through the liquid 13, the gas bubbles 47,48, and the liner 45, and by the time they—those, that is, travelling in the right direction—reach the detectors 402 they have been attenuated by their passage through these materials. The gas attenuates less than—the liquid, so that the detectors output a signal that is larger when the gamma rays came back through a gas bubble (and is larger the larger the bubble) than when they came back on a path missing the bubbles and thus only through the liquid. This output signal can therefore be used—in the correlator and calculator (not shown) to which it is sent (by means not shown)—first to identify a particular gas bubble 47,48 as it moves along the borehole, and then to calculate the speed of the bubble. Thus, for any particular gas bubble the output of the far detector 402f should match the slightly later output of the near detector 402n—which identifies the bubble—and, knowing the distance between the two detectors and the time between the two matching outputs there can be calculated the speed of the bubble.

It will be seen, incidentally, that the incoming gamma rays pass through both the annulus bubbles 48 and the liner core volume bubbles 47, so that the output of the two detectors 402 includes information about the total amount of gas travelling along the borehole. Thus, by a subtraction of the corresponding within-liner information from the local probe sensors 49 there can be deduced the flow rate for the gas travelling in the annulus.

What is claimed is:

1. A method of determining downhole in nearly-horizontal sections of a well borehole the flow rate of gas within a multiphase fluid containing a mixture of gas and liquid, the method comprising the steps of;

positioning within a length of a borehole of interest a logging tool carrying thereon a pair of local sensors spaced apart a known distance axially along the tool and thus along the borehole, each sensor being able to detect the difference between gas and liquid, and being mounted on arms extendible from a main body of the tool such that, with the tool positioned within the borehole, the sensors are disposed to be actually in a path of any gas bubbles likely to be in the fluid;

correlating the output of the pair of sensors to allow an identification of individual gas bubbles passing from one sensor to the other;

measuring the time taken for gas bubbles to pass from one sensor to the other;

determining from a distance-over-time calculation a gas bubble velocity;

determining a time-averaged hold-up of the gas within the multiphase fluid; and determining by a hold-up-times-borehole area-times-gas bubble velocity calculation the gas flow rate within the length of the borehole.

2. A method as claimed in claim 1, in which the sensors are fibre optic reflectance sensors or resistivity sensors.

3. A method as claimed in claim 1, wherein the pair of sensors are separated by a distance of 0.01 m to 3 m.

4. A method as claimed in claim 1, in which the time-averaged hold-up is obtained from averaging over many sequential measurements from a hold-up tool which measures snapshots of the gas hold-up at specific instants in time, and the hold-up tool utilizes either an array of optical reflectance probes or an array of local resistivity probes to map the position of gas within a cross section of the borehole.

5. A method as claimed in claim 1, wherein, to provide a better measurement of the gas bubble velocity, and thus the gas flow rate, in a slotted lined well, there is additionally obtained a measurement of what is happening in an annulus between a liner and a wall of the borehole.

6. A method as claimed in claim 5, further comprising the steps of:

determining a liner gas flow rate within a liner core;

employing on the logging tool a neutron generator capable of radiating generated neutrons though the liner and into a formation beyond the wall of the borehole, together with a pair of gamma ray detectors spaced apart a known distance axially along the tool and thus along the borehole, each gamma ray detector being able to detect formation-originating gamma rays created by the generated neutrons and so to thereby distinguish between gas and liquid;

correlating output of the pair of gamma ray detectors to allow an identification of individual gas bubbles passing from one detector to the other;

measuring the time taken for gas bubbles to pass from one detector to the other determining from a distance-over-time calculation the gas bubble velocity;

determining the time-averaged hold-up of the gas within the multiphase fluid;

determining by a hold-up-times-borehole area-times-gas bubble velocity calculation the total gas flow rate, within both the liner core and also the annulus, for that length of the borehole; and determining by a total gas flow rate-minus-liner gas flow rate calculation an annulus gas flow rate.

7. A downhole apparatus designed to determine downhole gas flow rates of a multiphase gas/liquid fluid, the apparatus comprising:

a logging tool to be positioned within a length of borehole of interest, the tool carrying thereon a pair of local sensors spaced apart a known distance axially along the tool and thus along the borehole, each sensor being able in use to detect the difference between gas and liquid, and being mounted on arms extendible from a main body of the tool such that, with the tool positioned within the borehole, the sensors are disposed to be actually in a path of any gas bubbles likely to be in the fluid; and a processor adapted to correlate output of the pair of sensors to allow an identification of individual gas bubbles passing from one sensor to the other, measure the time taken for gas bubble to pass from one sensor to the other, and determine from a distance-over-time calculation a gas bubble velocity, whereby there may be determined a time-averaged hold-up of the gas within the multiphase fluid, and whereby by a hold-up-times-borehole area-times-gas bubble velocity calculation there may then be determined the gas flow rate within the length of the borehole.

8. An apparatus as claimed in claim 7 and for determining downhole gas flow rate in a borehole that utilizes a slotted liner, which apparatus is as previously defined and additionally includes:

on the logging tool a neutron generator capable of radiating generated neutrons though the liner and into a formation beyond the wall of the borehole, together with a pair of gamma ray detectors spaced apart a known distance axially along the tool and thus along the borehole, each gamma ray detector being able to detect formation-originating gamma rays created by the generated neutrons and to thereby distinguish between gas and liquid;

wherein the processor is adapted to correlate output from the pair of gamma ray detectors, and whereby, by a total gas flow rate-minus-liner gas flow rate calculation, there may be determined an annulus gas flow rate.

* * * * *